US006575362B1

(12) United States Patent
Bator et al.

(10) Patent No.: US 6,575,362 B1
(45) Date of Patent: Jun. 10, 2003

(54) SECURE MONEY ORDER ISSUING KIOSK

(75) Inventors: Feliks Bator, Easton, CT (US);
William Berson, Weston, CT (US);
John L. Campo, Trumbull, CT (US);
Kathryn V. Lawton, Branford, CT (US); Andrei Obrea, Wilton, CT (US);
Michael Y. Swaluk, Redding, CT (US);
Monroe A. Weiant, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 08/775,546

(22) Filed: Dec. 31, 1996

(51) Int. Cl.[7] ................................................. G06F 7/08
(52) U.S. Cl. ....................................... 235/381; 235/379
(58) Field of Search ..................... 364/479.05, 479.06, 364/479.07; 235/379, 432, 462, 381; 400/104, 663; 902/1

(56) References Cited

U.S. PATENT DOCUMENTS

| 4,846,502 A | * | 7/1989 | Chang et al. | 283/57 |
| 5,021,967 A | * | 6/1991 | Smith | 364/479 |
| 5,056,019 A | * | 10/1991 | Schultz et al. | 364/405 |
| 5,243,174 A | * | 9/1993 | Veeneman | 235/381 |
| 5,267,314 A | * | 11/1993 | Stambler | 380/24 |
| 5,377,271 A | * | 12/1994 | Foreman | 380/51 |
| 5,442,162 A | * | 8/1995 | Armel | 235/381 |
| 5,483,049 A | * | 1/1996 | Schulze, Jr. | 235/383 |
| 5,500,514 A | * | 3/1996 | Veeneman | 235/381 |
| 5,513,117 A | * | 4/1996 | Small | 364/479 |
| 5,524,073 A | * | 6/1996 | Stambler | 380/24 |
| 5,555,303 A | * | 9/1996 | Stambler | 380/25 |
| 5,646,998 A | * | 7/1997 | Stambler | 380/25 |

* cited by examiner

Primary Examiner—Thien M. Le
(74) Attorney, Agent, or Firm—Ronald Reichman; Alberta A. Vitale; Angelo N. Chaclas

(57) ABSTRACT

An apparatus for issuing money orders and similar instruments and for securing payment therefor is provided as a subsystem of an existing kiosk of a type including, but not limited to postal kiosks, informational kiosks, Automated Teller Machines (ATM), Point of Sale terminals (POS), vending machines and the like, or any combination thereof. Payment is secured by drawing funds directly from a customer's bank account; by drawing funds from a smart card, or by accepting currency through a bill acceptor. The apparatus further includes facilities for redeeming money orders and dispensing cash amounts corresponding thereto.

7 Claims, 2 Drawing Sheets

SECURE MONEY ORDER ISSUING KIOSK

TECHNICAL FIELD

This invention relates to method and apparatus for generating and issuing financial instruments, such as money orders and similar negotiable instruments, and for securing payment therefor by drawing funds directly from a customer's bank account, by drawing funds from a smart card, or by accepting currency through a bill acceptor. The invention more particularly relates to apparatus which may be provided as a subsystem of an existing stand-alone device, such as a postal kiosk, an informational kiosk, an Automated Teller Machine (ATM), a Point of Sale terminal (POS), a vending machine and the like.

BACKGROUND ART

Transfer of funds between parties to a commercial transaction is essential for completion of such transactions. The simplest and most straight-forward exchange involves cash, in a physical exchange of currency. However, in a more complex society where transactions involve great distances and are conducted between parties who do not know each other, various other approaches are available for implementing such transfers of funds, ranging from transactions involving orders (drafts) directing a third party (such as a bank) to debit an account of a drawing party by a specified amount and to provide that amount to a presenting party, to still more complex transactions involving credit cards, debit cards, electronic funds transfers (EFT) and the like.

One system implementing a financial transaction is described in U.S. Pat. No. 5,121,945 to Thomson et al, wherein various accounting functions are implemented by combining data from two or more sources to prepare an integrated document, including an invoice and a negotiable instrument, such as a bank check.

Another approach is disclosed in Benton et al. U.S. Pat. No. 4,960,981, which provides an online electronic funds transfer system incorporating facsimile machines to transfer electronic funds data of buyers and sellers located at common or remote points of sale for clearance by an automated clearing house (ACH) or other facility.

Each of these systems involves various steps and accounting procedures which enhance the security associated with various transactions. However, it is frequently desirable or necessary to undertake financial transactions in a simplified manner, similarly to utilization of cash transfers, without the necessity of undertaking the complexities of check writing and cashing, and without requiring the parties themselves to have (or have access to) facilities capable of implementing EFT, or credit and debit transactions. The above described systems implement transactions in a manner that is significantly more complex than cash transactions, and are thus less likely to be used to replace cash transactions.

However, it is also known that transfers of cash and currency lack the security afforded by the other forms of funds transfers hereinabove described. Accordingly, there has evolved a form of funds transfer intermediate the simplicity of currency transfers in the form of cash exchanges, which are essentially devoid of security measures, and the more secure (but more complex) transactions involving drafts, EFT, debit and credit cards.

In such an intermediate form of funds transfer, money orders are used, instead of exchanges of cash between two parties to a transaction. Such money orders are, effectively, promises to pay made by a third party, whose reputation, credit and solvency are known to, and accepted by, both parties to the transaction. However, although conceptually simple, from a practical point of view it is frequently bothersome to obtain such money orders.

That is, one or both parties to a transaction must visit a facility of the third party, where the third party (or its personnel) may accept appropriate payment from one of the parties in cash, or upon verification of identity and of funds availability of the party if other forms of payment are used, in order to issue such a money order. As one example, the United States Postal Service is known to issue money orders. However, although numerous postal facilities are available throughout the United States, the number of such facilities is necessarily limited. Similarly, while banks may issue similar negotiable instruments, whether in the form of a cashier's check or other instrument, the number of banking facilities is also limited.

Moreover, in order to obtain money orders or similar instruments at such facilities, it is frequently necessary to wait for service and, once attended to, to await completion of appropriate identity verification prior to issuance of the money order. Thus, in order to implement such a transaction it is frequently necessary to lose potentially valuable time.

In Minematsu et al. U.S. Pat. No. 4,833,312 there is described a lobby organization for a financial institution to include a system for implementing transactions between financial institutions and their customers. The system is intended to simplify such transactions and, as disclosed therein, provides devices in the lobby of the financial institution for operation by the customers. Devices such as automated teller machines (ATM's) are contemplated, used to keep customers better informed and to eliminate paperwork requirements. While the disclosed transaction system is indicated as having money orders as one of its categories, the term as used therein appears to relate to a literal translation from the original language of the Minematsu disclosure, with respect to ordering of money from an ATM for example, rather than to the specific financial instrument used in the U.S. as contemplated herein. Thus, while a cash dispensing ("CD") machine is disclosed as well as a passbook/certificate printer, none of the disclosed transactions relates to generating a secure instrument which may be provided to a second party in lieu of cash.

Indeed, the '312 patent teaches (at columns 11 and 12 thereof) a paperless system in which the only thing that has to be done is to confirm agreement between the total amount of money registered and the total amount of cash. Thus, when the disclosed transaction system refers to a "money order"category, such reference is with respect to informing a teller at a first line terminal of the nature of a customer's business, to permit the teller to implement the transaction as described at column 13 therein.

The prior art thus fails to disclose any system which includes a plurality of devices, or kiosks, enabling customers to operate independently to generate secure financial instruments such as money orders at any desired location and at any time, subject only to a verifiable presentation of currency or presence of funds in an account to be debited therefor.

There is accordingly a need for a system of generating money orders which is free of such deficiencies.

More particularly, there is a need for a system capable of providing numerous facilities, each capable of quickly and efficiently generating and issuing money orders, while also maintaining a high level of security to assure that appropriate payment for the money orders, as well as for any fees and expenses associated therewith, is properly made by users of such facilities.

DISCLOSURE OF THE INVENTION

It is accordingly an object of the present invention to provide a customer operated system for generating financial instruments having value, such as money orders and the like.

It is a more specific object of the invention to provide an automated system which verifies receipt of appropriate funds, and which generates money orders and similar instruments in accordance with the received funds, automatically, quickly and efficiently.

It is yet another object of the invention to provide a universally accessible, automated, system for securely generating financial instruments such as money orders, which is not limited to specific facilities, and which may operate in conjunction with known automated facilities such as postal kiosks, informational kiosks, automated teller machines (ATM), point of sale terminals (POS), vending machines or the like, or any combination of the above.

It is still a more specific object of the invention to provide a subsystem, suitable for incorporation in and use with available automated facilities, for securely generating and issuing financial instruments such as money orders.

It is yet another object of the invention to provide a system for generating and issuing financial instruments such as money orders and for securing payment therefor by drawing funds directly from a customer's bank account, by drawing funds from a smart card, or by accepting currency through a bill acceptor.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

Figure 1:
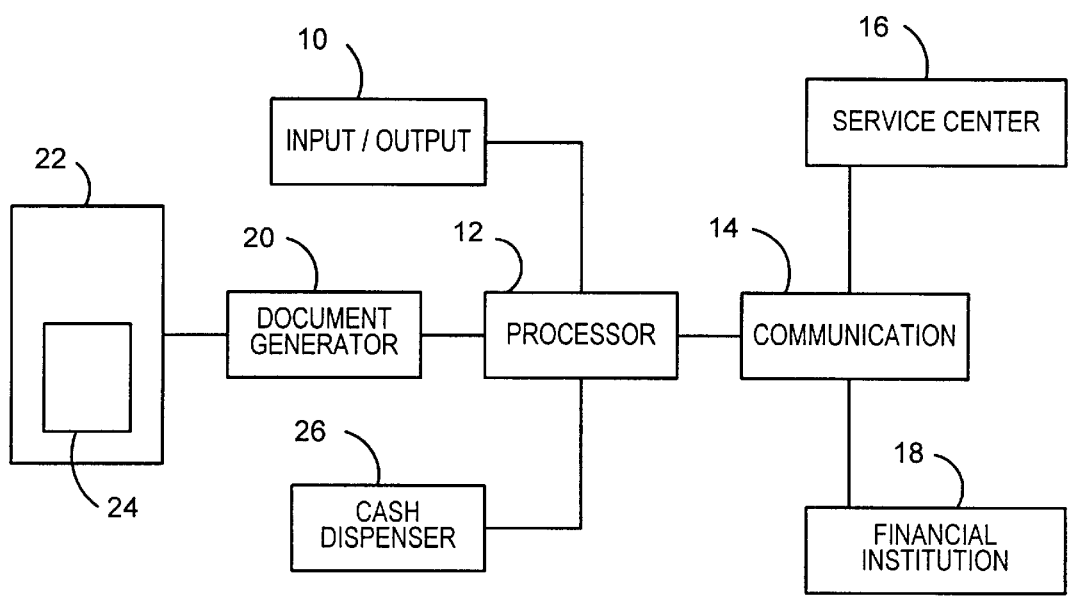
FIG. 1 is a block diagram representation of the present invention.

Referring now to the drawings, there is shown in FIG. 1 a system embodying a preferred embodiment for carrying out the invention. The inventive system is preferably housed in a facility typically known as a kiosk, which may either be a stand-alone facility or may be a facility already operational for implementing other functions, such as a postal kiosk, an informational kiosk, an ATM, a POS terminal, a vending machine and the like. It should be appreciated that where the inventive system is housed in an existing facility implementing other functions, various of the components illustrated in FIG. 1 may in fact utilize components of the existing facility, and may be shared therewith.

In accordance with the invention, there is provided an input/output section 10 for providing information to a processor 12 which controls operation of the invention and which thus implements the invention. The processor 12 preferably includes a programmed computer or microprocessor, such as are commonly known and available under the designations 80386, 80486, 80586, or any other appropriate processor. Though not explicitly shown, processor 12 also includes appropriate read only memory (ROM) and random access memory (RAM) storage for the program executed thereby and for the input data provided thereto from input/output section 10, for example, or from remote data sources communicating therewith via a communication section 14.

Communication section 14 may include a modem or other communication device for communication via telephone lines, but may alternatively include devices for infra-red communication, radio-frequency communication, or any other known means for communication with remote data sources at a service center 16 for the system or a financial institution 18. Service center 16 may provide appropriate encryption and decryption codes to implement various security measures, as known in the art and as described in various documents described hereinbelow and incorporated herein by reference.

When payment for the money order being issued is to be made by debiting a customer's account, financial institution 18 is contacted. Thus, although a single institution 18 is shown, it should be appreciated that the apparatus of the invention has the capability to communicate with any financial institution identified by a customer as a depositary of that customer's account (i.e., identified as a source of funds to pay for the money order being generated) via communication section 14.

Document generator 20 may be a printer or other device, which generates a secure document 22 embodying the money order. The money order generated by the inventive system preferably includes a security label 24, generated communication with service center 16 for example. The label may be generated in accordance with the techniques disclosed in Berson U.S. Pat. No. 5,388,158, or in accordance with any other known technique. Thus, the security label 24 may be a two dimensional barcode printed on the money order to guard against forgery or alteration of document 22 and to enable verification of the document when presented for payment.

For kiosks incorporating a money order redemption feature in the inventive apparatus, there is provided a cash dispenser 26. In this embodiment of the invention, a customer presents a money order 22 to input/output section 10 which scans the document and permits the processor 12 to verify authenticity thereof in the manner described in Berson et al. U.S. Pat. No. 5,384,846 for example, or in accordance with any other known technique. Upon verification of authenticity and validity of the presented money order, processor 12 may authorize cash dispenser 26 to dispense the funds covered by the money order while also modifying the presented money order to indicate that the value represented thereby has been redeemed. It should be appreciated that, as a straight-forward and simplified implementation of this function, processor 12 may be programmed to direct the input/output section 10 to destroy, remove or modify security label 24 of the money order being redeemed.

In accordance with the guidance provided herein, each of these functions is easily implemented using the documents incorporated herein and no further description is believed necessary.

Figure 2:
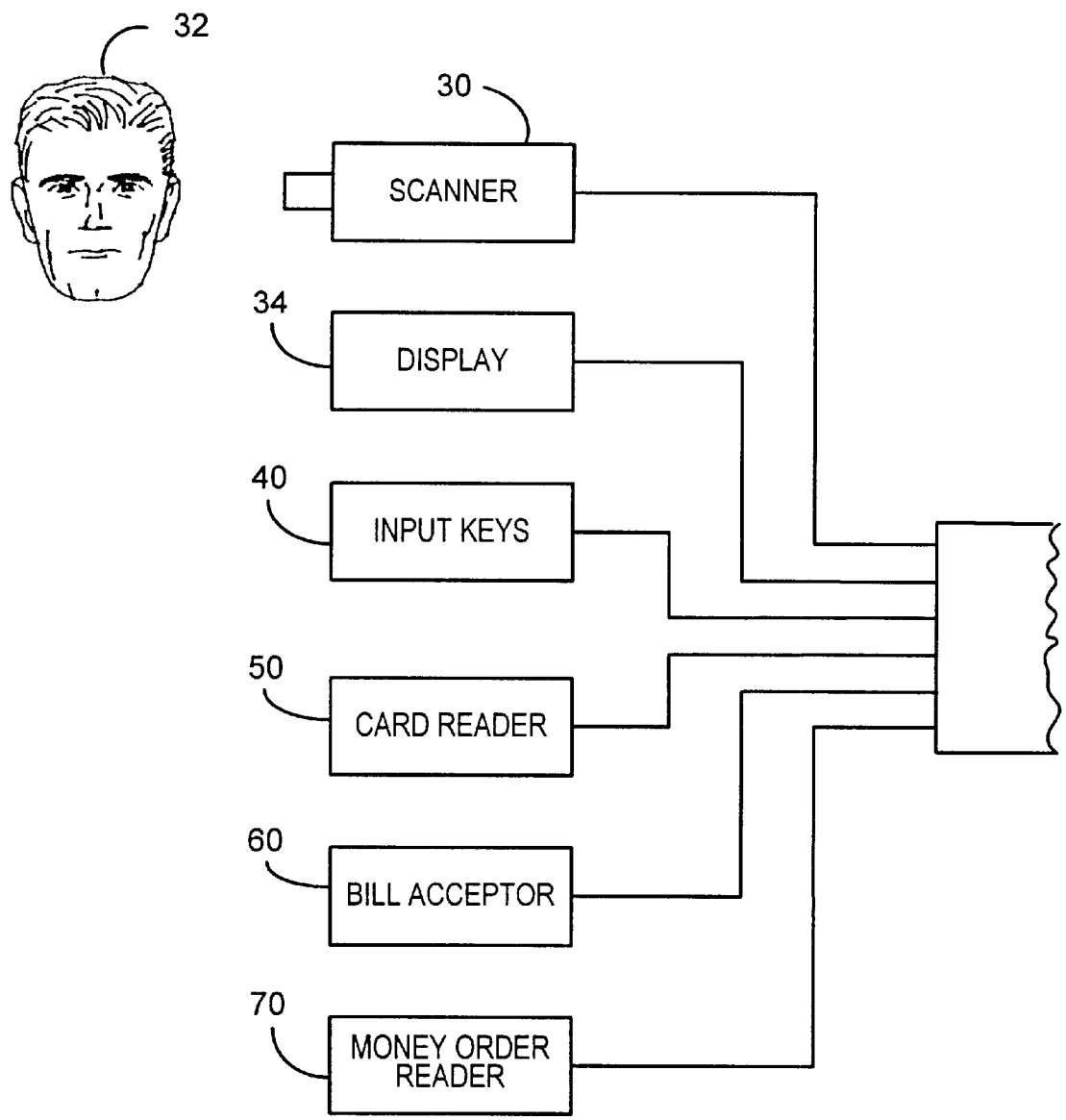
FIG. 2 is a block diagram representing the input block of FIG. 1.

In order better to appreciate the manner of operation of the invention and the manner in which money orders and similar instruments are issued, and the manner in which payment therefor is secured, reference is now made to FIG. 2. As will be appreciated from the following description, payment for the money order is secured by drawing funds directly from a customer's bank account, by drawing funds from a smart card, or by accepting currency through a bill acceptor.

As shown in FIG. 2, input/output section 10 may include a scanner 30, which may be used to scan an image of the customer 32, to obtain biometric data for example. Such scanning may be used in conjunction with various ID documents to verify the customer's identity when withdrawing funds from an account at a remote financial institution 18, for example. However, identification may be independent of the customer's image and may, instead, rely on other biometric data or other ID forms, such as PIN codes and the like which may be encrypted thereon or which may be received from the remote financial institution.

Input/output section 10 preferably also includes a display 34, or other output device for communicating with the customer, as well as a number of input keys (or switches) 40, which may be in the form of a numerical keypad (or other keyboard) for inputting customer selection of the transaction to be implemented, as well as for inputting identifying PIN codes. Use of such devices for input and output communication between a customer and a processor in ATM's is known, and further description of the same is thus unnecessary.

A card reader 50 is provided for accepting payment by debiting accounts accessed via credit or debit cards, or by directly debiting the amounts of value stored in smart cards. Such a card is typically an integrated circuit value card having a microprocessor and memory (not shown), or memory only, configured to implement specified applications. That is, the microprocessor of the card 22 may be programmed to perform various functions associated with the applications for which the card is suited. Thus, a smart card may have a funds application permitting crediting of funds thereto and debiting of funds therefrom.

It is known to issue smart cards having particular value at designated value centers. Chen et al U.S. Pat. No. 4,978,839 for example, the contents of which are incorporated herein by reference, describes a postage meter recharging system using a smart card (or paper card), issued by a value card center either in fixed or variable denominations as requested. Such a card may be used in the embodiment of FIG. 1.

Card reader 50 thus includes an output device for communicating with and modifying the value stored in a smart card, when a smart card is used to pay for the money order. The apparatus of the present invention preferably communicates with card 22 in a known secure and encrypted fashion as described below, to decrement a value stored in a funds register thereof for example, to provide payment for a money order.

U.S. Pat. No. 4,629,871, the contents of which are incorporated herein by reference, implements secure communication between two facilities, utilizing sequences of pseudo random numbers and wherein each facility generates a combination which is a match of the other. The combination may be provided by a data link, and may be provided to an operator or may be communicated without an operator. Thus, such secure communication may be utilized in a communication between the apparatus of the invention and the smart card. The details of such communication are not repeated herein.

When an account at a remote financial institution is relied upon by a customer to pay for a money order, the appropriate information from the card is read by card reader 50 in a known way and conveyed to processor 12. Processor 12 then communicates with the appropriate remote financial institution 18 wherein the account is maintained, and an appropriate funds transfer is initiated.

Thus, whether a customer wishes to pay for a money order by charging the same to a credit card account, by debiting the amount from a bank account or other account, or by deducting the amount from value previously stored in a smart card, input/output section 10 includes appropriate sources of input data for reading the appropriate card, for accepting the required identification information via a keyboard 40, for providing biometric data (e.g., via scanner 30) where appropriate, and for debiting the appropriate account.

As also shown in FIG. 2, in accordance with the invention the input/output section 10 also includes a known bill acceptor device 60, to permit a customer to pay for a money order using cash. Although the term "bill acceptor" is used, it should be appreciated that it is within the scope of the invention to accept coinage as well as bills as payment for a money order.

Finally, input/output section 10 also includes a money order reader 70 for reading money orders of the type generated in accordance with the invention. By including such a reader, the invention provides a full service money order center, wherein a customer may either purchase or redeem money orders. Upon appropriate verification and authentication by reader 70 of a money order presented by a customer, using various encrypting and decrypting techniques such as described in Berson U.S. Pat. No. 5,388,158 and Berson et al. U.S. Pat. No. 5,384,846 for example, reader 70 provides a confirmation message to processor 12 which, responsively thereto, controls cash dispenser 26 to dispense the appropriate amount of cash.

At the same time, processor 12 also controls reader 70 either to retain, destroy or modify the money order, whether by retaining, destroying or altering the security label thereof, by punching a hole or similarly altering the medium on which the money order is printed or encoded, or by printing thereon a code, a humanly readable message, or both, signifying redemption of the money order.

To the extent that the invention is implemented as an add-on subsystem for an existing kiosk, it should be understood that any of the elements of input/output section 10 shown in FIG. 2 which are already present at the kiosk may be omitted from the added subsystem to avoid duplication or unnecessary expense, and the functions thereof may thus be performed by the existing elements.

Additional specific features of operation of the inventive system may be understood from the following summary.

In accordance with the invention, a kiosk may issue money orders and similar instruments in three modes of operation: (1) by drawing funds directly from a customer's account; (2) by drawing funds from a smart card; and (3) by accepting currency.

In the first mode of operation, the money order issuing kiosk uses communication section 14 to implement an on-line real-time connection to bank and credit accounts, and performs money order issuing transactions automatically without human intervention. In order to implement this approach, a customer is first identified by the system with the aid of a smart card, PIN number, biometrics data or the like. Where biometric data is relied upon, highly sophisticated instruments are known and available in the art for obtaining such data. Such instruments are capable of measuring fingerprints, voice prints, retinal patterns, etc., as well as obtaining photographic images of the customer, as disclosed in Axelrod et al. U.S. Pat. No. 5,337,358, the contents of which are explicitly incorporated herein by reference.

Thus, scanner 30 may be used for inputting such biometrics data and may be augmented by other devices known in the art.

The customer receives the requested money orders, providing that a security access test is passed, that (when communication with the financial institution 18 is necessary) it is verified that there are enough funds in the customer's bank or credit account, and that money order checks (or coupons) are available in the kiosk.

In the second mode of operation, after passing similar security measures to those described with respect to the first mode, the money orders are issued after appropriate amounts of funds are first deducted from the smart card, rather than from the customer's remote account. As will be appreciated from the previous description of smart cards, such deduction of funds may be implemented by reducing the value stored in a register on the card in a secured communication between the apparatus of the invention and the smart card.

In the third mode of operation, a customer is first identified only for fraud tracking purpose. The requested money order is issued only after a sufficient amount of money is deposited in the kiosk via bill acceptor 60. Otherwise, the requested transaction is canceled and any money previously deposited in connection with that transaction is returned to the user.

In all three modes of operation, a predefined service charge may be applicable and, if so, the user is first notified of the charges by the kiosk via display 34, which is generally used to guide the customer in operating the kiosk. The user is permitted the option of canceling the transaction at any time before the money order is issued by the kiosk. Should the user cancel a transaction, the amount deposited by the user is returned without imposition of service charges.

The money orders are issued by the kiosk by means of document generator 20, a built-in, secure money order dispenser. The kiosk is periodically refilled with money orders by operations personnel.

Addressing now the details of the three modes of operation under which money orders are generated, in the first mode, wherein funds are drawn directly from a customer's remote account, a user logs in into the kiosk in a known way. Processor 12 is programmed to require the kiosk to identify the user, by built-in identification means such as an ID card issued to system users for example, as well as by using a PIN, or by relying on one or more biometrics means. Once identification is complete, processor 12 logs the transaction for the record and allows the user to access the money order issuing function.

Once access is granted for a user to access the money order issuing function of the kiosk, the user is led interactively, step-by-step, through the process of ordering a desired amount of money orders, in individual denominations as requested by the user. It will be appreciated that, upon consideration of the suggestions provided herein, programming processor 12 to implement the suggested sequence of functions becomes straightforward.

When an order is placed correctly (i.e., is recognized and accepted by processor 12), the kiosk creates a money order request data packet. Such a data packet includes various identification data, and may specifically include identification data of the specific kiosk, user identification data, smart card data, system access data, requested transaction information and additional biometrics data, where necessary. For example, a digitized user's picture may be taken by scanner 30 when the request is made. Moreover, current date and time stamp data, as well as other information, may be included in the data packet. Finally, the system creates its own digital signature and attaches the same to the request data packet.

The kiosk securely dials up the financial institution 18 having the user's account, whether the user's bank or a third trusted party, and securely obtains authorization therefrom for issuing the user designated amount of money orders. The transaction authorization message which is returned securely back from the financial institution to the kiosk preferably includes the majority of original data transmitted from the kiosk, along with an authorization code. The authorization code may include any desired information, as defined in respective regulations or standards governing such transactions and as specified by the authorizing party itself.

To provide increased levels of verifiability and system security, the request data packet, the authorization code, and various printed information from each money order coupon (e.g., pre-printed coupon identification number or code), are first appended by additional error detection and correction data, and all the information is then compressed, encrypted (using a predefined public or private key encryption protocol) and converted into a print image. The kiosk then affixes the print image to the money order coupon, such as by printing the same in a form of a two-dimensional barcode using either visible or non-visible ink (or by providing the same in any other appropriate form of coding), described herein as a "security label".

A security label in accordance with the invention may thus include a magnetic code stored on a magnetic stripe or other region provided on the coupon, an optical code stored or embossed on the coupon, or may use any other available form of data storage. The security label may be directly printed on the money order coupon or may be otherwise affixed thereto. As hereinabove noted, upon redeeming a money order, the security label may be removed from the coupon or may be otherwise modified to prevent attempts to redeem the money order a second time.

Methods and apparatus for implementing such coding, and for incorporating the same into printed documents, are known in the art. For example, Berson U.S. Pat. Nos. 5,384,846 and 5,388,158 disclose such a method and apparatus. The contents of U.S. Pat. Nos. 5,384,846 and 5,388, 158 are explicitly incorporated herein by reference.

In such implementations, a signal representing an image is encrypted using a public key encryption system. The key may be downloaded from service center 16 and may be changed from time to time in order to increase security. To facilitate authentication the corresponding decryption key is encrypted with another key and, when used in conjunction with the system of the present invention, the resultant code is incorporated on the money order coupon being produced as the above noted security label, whether as a two dimensional barcode or as any other appropriate form of label.

A system producing such a secure authenticated coupon according to the invention may include in money order reader 70 a scanner which produces a first signal representative of an image of the money order coupon. Such a system may further include an encrypter for encrypting a second signal, which is derived at least in part from the first signal and which includes a representation of the coupon image, and a coder for incorporating a coded representation of the encryption of the second signal onto the security label to be affixed to the coupon. Such a system is disclosed in the Berson patents and no further description is thus believed to be necessary herein. However, the present invention is not limited to such authentication and may incorporate any applicable approach.

However, where the above described system is utilized to validate a money order coupon upon presentation for redemption, the encoded image is scanned from the security label by reader 70, decoded, decrypted, expanded and displayed. The money order coupon is then authenticated by comparison of the displayed representation of the encoded image and the money order coupon itself.

To provide such validation the kiosk money order system according to the invention may include (as separate hardware components in communication with processor 12 or as separate software modules implemented therein) a decoder for decoding the coded representation of the second signal, a decrypter for decrypting the decoded signal, and a display for displaying the representation of the image incorporated in the second signal. Such a validating apparatus is disclosed in the Berson patent and no further description is thus believed to be necessary herein.

Still other information may also be included in the security label, in a manner disclosed in the above described Axelrod et al. and Berson patents. As disclosed therein, a security label may include a first portion which is presented in human recognizable form, such as an image of the user, along with a coded representation of an encrypted signal as hereinabove described.

In the second mode of issuing a money order, wherein (using one of many possible simultaneous applications on a smart card) the user's smart card is used as a debit card and the card holds a sufficient value amount to cover a requested amount money order, the invention debits the smart card and issues the money order. Kiosk usage charges may be applicable and may also be debited from the smart card.

A user having a smart card accesses the system and specifies an amount of a money order similarly to the above described procedure for debiting customer accounts at remote financial institutions. However, instead of dialing up to obtain a transaction authorization from the remote institution, processor 12 of the kiosk makes such a decision locally, based on validity of the smart card and the funds available in the card itself. Providing the funds are available, processor 12 then first deducts the requested amount of funds from the card, time and date stamps the current transaction and prints the same on the money order coupon, in a similar way as described above.

In the third mode of operation, where currency is used to purchase the money order, the customer is first identified for purposes of fraud tracking only. As above noted, the requested money order is only issued after a sufficient amount of actual money is deposited in the kiosk via a built-in bill acceptor. Otherwise, the requested transaction is canceled and deposited money returned to the user.

Similarly to the two other modes of operation, processor 12 controls the inventive system to print all relevant information, on the back of each money order coupon for example, in a secure way employing two dimensional barcode or other technology for implementing a security label.

In each of the approaches used to issue a money order, the whole transaction is preferably time and date stamped as noted in the Axelrod et al. patent and, in a batch mode, is uploaded to the system administrator. Numerous reports are generated for all parties involved in the transaction according to federal, state and local laws, as well as in accordance with requirements agreed upon by the participating parties. Thus, reports are generated immediately for a customer and, at a later desired time, appropriate reports are also generated for all other parties involved in the transactions according to federal, state and local laws as well as per participating parties requirements.

As above noted, a money order issuing kiosk may also include a reader 70 to permit redemption of money orders issued by the system. It should be appreciated that stand-alone redemption devices may be provided separately from money order issuing devices. Identity verification and security measures are an integral part of a money order issuing kiosk system as hereinabove disclosed. Thus, separate security is thus not provided for a redemption system incorporated in a money order issuing kiosk. However, such security measures must be separately included in any money order redemption system which is a stand alone kiosk that is not equipped to issue money orders.

Such a security system, which may be referred to as a verifier, verifies a person's authenticity by a combination of features as hereinabove described. A known verifier system scans the two-dimensional barcode (security label) on the back of a money order coupon presented for redemption and compares the same to the current user's data and/or the printed information, as provided on the front side of the money order coupon for example, including the pre-printed coupon identification number or code. When the two sets of information agree, processor 12 permits the money order to be cashed, or to be used as payment. Otherwise, if a fraud is detected, predefined security measures may be taken.

The foregoing description of the preferred embodiment of the invention has been presented for purposes of illustration and description. It is not intended to be exhaustive or to limit the invention to the precise forms disclosed, since many modifications or variations thereof are possible in light of the above teaching.

For example, although electronic cards, in the form of credit cards, debit cards and smart cards have been described as sources of account information, a system according to the invention may rely strictly on information provided by the customer with the aid of the input keyboard, and may authenticate the same with the aid of biometric data, or by obtaining stored information which is either locally stored or by communication with a remote center. Additionally, rather than debiting a customer's accounts or smart cards by the full value of a money order, by previous arrangement the amount debited may be agreed upon to be less than the value of the issued money order, with the remainder being paid at a later time, as in the case of credit card transactions. Still further, although redemption of a money order has been described as relating to dispensing of cash, it will be appreciated from the foregoing that, instead of cash, credit may be issued as by adding value to a register on the smart card.

All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

What is claimed is:

1. A method of producing and redeeming a negotiable instrument comprising the steps of:

receiving via an input/output means a request from an issuing customer for a negotiable instrument of a requested value;

generating a guiding instruction for the issuing customer and outputting said instruction on a display portion of said input/output means;

receiving a payment from the issuing customer;

upon authentication of the received payment, generating a security label and producing the negotiable instrument having the security label affixed thereto;

receiving via said input/output means a request from a redeeming customer for redemption of the negotiable instrument;

comparing the security label with information obtained from the redeeming customer;

upon authentication of the information from the redeeming customer, dispensing assets to the redeeming customer.

2. The method of claim 1, wherein said step of dispensing assets comprises invalidating the negotiable instrument.

3. The method of claim 2, wherein said step of receiving a payment comprises:

receiving from the issuing customer account identification information identifying an account of the issuing customer and security information identifying authorization to access the account; and authentication of the received payment comprises:
   communicating with a remote location storing the account;
   verifying the security information;
   verifying presence of value in the account corresponding to the requested value; and
   transferring the requested value from the account.

4. The method of claim 3, wherein said step of verifying the security information comprises obtaining biometric information of the issuing customer and comparing the obtained biometric information with biometric information descriptive of the issuing customer included in said security information.

5. The method of claim 2, wherein said step of receiving a payment comprises:

receiving from the issuing customer account identification information identifying an account of the issuing customer and security information identifying authorization to access the account; and authentication of the received payment comprises:
   communicating with a remote location maintaining the account;
   verifying the security information;
   verifying availability of value in the account corresponding to the requested value; and
   charging the requested value to the account.

6. The method of claim 2, wherein said step of receiving a payment comprises:

reading an electronic card provided by the issuing customer, and authentication of the received payment comprises:
   verifying the security information provided by the issuing customer;
   verifying that a value storage portion of the electronic card stores value corresponding to the requested value; and
   debiting the value storage portion of said electronic card by the verified value.

7. The method of claim 6, wherein said electronic card comprises a smart card having a processor and a storage, and said steps of reading the electronic card, verifying security information, verifying value storage and debiting the value storage portion each comprises using encryption for securely communicating with said processor of said smart card.

* * * * *